US011696050B2

United States Patent
Dobashi

(10) Patent No.: US 11,696,050 B2
(45) Date of Patent: Jul. 4, 2023

(54) IMAGING APPARATUS, METHOD FOR CONTROLLING IMAGING APPARATUS, AND STORAGE MEDIUM

(71) Applicant: CANON KABUSHIKI KAISHA, Tokyo (JP)

(72) Inventor: Toshiyuki Dobashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 16/951,970

(22) Filed: Nov. 18, 2020

(65) Prior Publication Data
US 2021/0160445 A1    May 27, 2021

(30) Foreign Application Priority Data
Nov. 26, 2019  (JP) .................... 2019-213416

(51) Int. Cl.
H04N 25/674    (2023.01)
G06T 5/00      (2006.01)
H04N 23/67     (2023.01)

(52) U.S. Cl.
CPC .......... *H04N 25/674* (2023.01); *G06T 5/003* (2013.01); *H04N 23/67* (2023.01)

(58) Field of Classification Search
CPC .................................................... H04N 5/3656
USPC ...................................................... 348/222.1
See application file for complete search history.

(56) References Cited

U.S. PATENT DOCUMENTS

2008/0297649 A1* 12/2008 Subbotin ................. G02B 7/36
                                                348/352
2017/0257555 A1*  9/2017 Li ................... H04N 5/232121

FOREIGN PATENT DOCUMENTS

JP     2012128314 A    7/2012

* cited by examiner

*Primary Examiner* — Joel W Fosselman
(74) *Attorney, Agent, or Firm* — Canon U.S.A., Inc. IP Division

(57) ABSTRACT

An apparatus includes an acquisition unit configured to acquire distance information that indicates a distance to a subject on each predetermined region in a captured image, a control unit configured to adjust a focus position, and a storage unit configured to store first distance information acquired by the acquisition unit in response to the adjusted focus position. The control unit readjusts the focus position based on the first distance information and second distance information acquired by the acquisition unit.

20 Claims, 14 Drawing Sheets

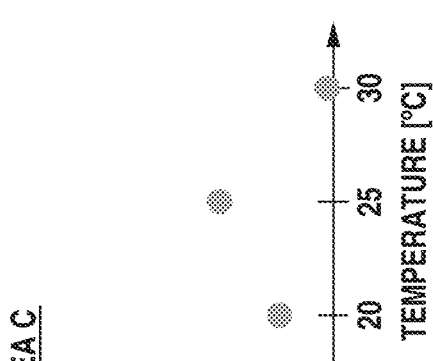
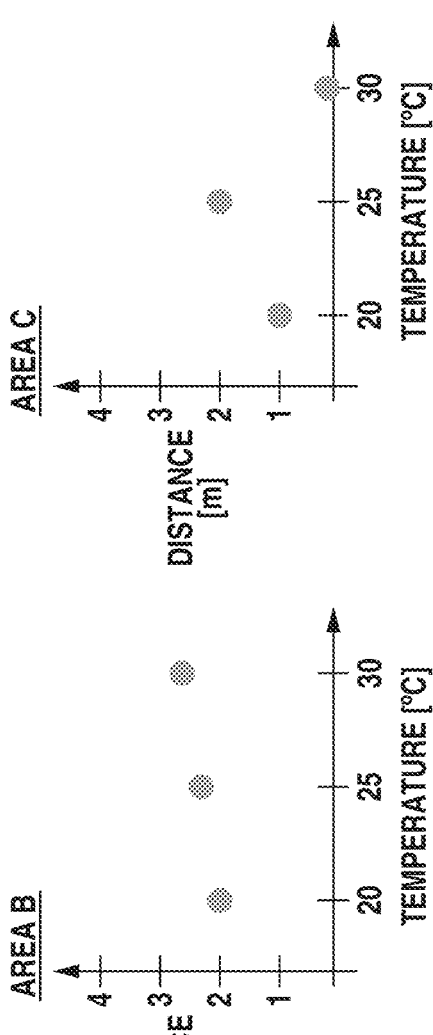
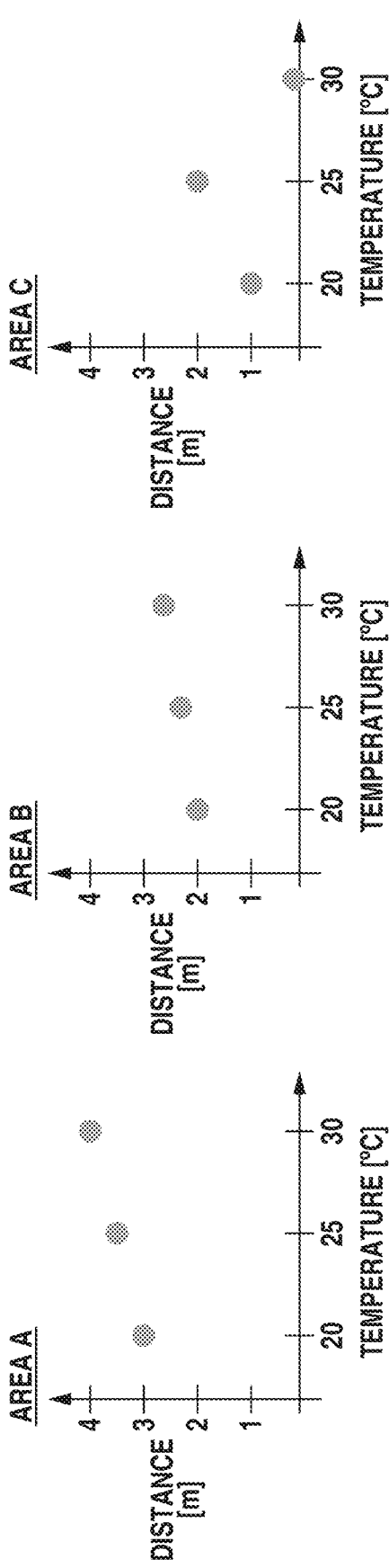

IMAGING APPARATUS, METHOD FOR CONTROLLING IMAGING APPARATUS, AND STORAGE MEDIUM

BACKGROUND OF THE DISCLOSURE

Field of the Disclosure

The aspect of the embodiments relates to a technique for correcting defocus in an imaging apparatus.

Description of the Related Art

Some imaging apparatuses perform automatic focus (AF) control of controlling the position of a focus lens at which the imaging optical system is focused on a subject. Further, some imaging apparatuses include a memory that stores electronic cam data indicating the positions of the focus lens at individual zoom positions of the zoomable (variable power) imaging optical system for each of the plural distances to a subject, with the subject in focus at each of the distances. Such an imaging apparatus can keep the subject located at a distance in focus and fix the focus position even as the zoom position is changed, by carrying out zoom tracking of controlling the position of the focus lens with the electronic cam data in response to the imaging apparatus being zoomed.

However, even though the focus position is fixed in the above-described manner, the focus lens may be displaced, causing a blur (defocus) due to a cause such as expansion or compression of the imaging optical system or the imaging apparatus through a change in the temperature. For a correction of such a blur, the position of the focus lens is corrected for the amount of the blur. The amount of the blur due to the change in temperature varies among imaging optical systems or imaging apparatuses. This may prevent the blur from being corrected well with a common correction amount.

Japanese Patent Application Laid-Open No. 2012-128314 discusses an imaging apparatus that performs the AF control to correct a blur due to a change in temperature detected by a temperature sensor.

However, the imaging apparatus discussed in Japanese Patent Application Laid-Open No. 2012-128314 may fail to make a sufficient correction, for example, when a subject targeted for AF control moves.

SUMMARY OF THE DISCLOSURE

According to an aspect of the embodiments, an apparatus includes an acquisition unit configured to acquire distance information that indicates a distance to a subject on each predetermined region in a captured image, a control unit configured to adjust a focus position, and a storage unit configured to store first distance information acquired by the acquisition unit in response to the adjusted focus position. The control unit readjusts the focus position based on the first distance information and second distance information acquired by the acquisition unit.

Further features of the present disclosure will become apparent from the following description of exemplary embodiments with reference to the attached drawings.

BRIEF DESCRIPTION OF THE DRAWINGS

FIGS. 13A to 13D are diagrams each illustrating an example of a relationship between temperature and distance according to the fifth exemplary embodiment.

DESCRIPTION OF THE EMBODIMENTS

Exemplary embodiments of the disclosure will be described with reference to the drawings.

Figure 1:
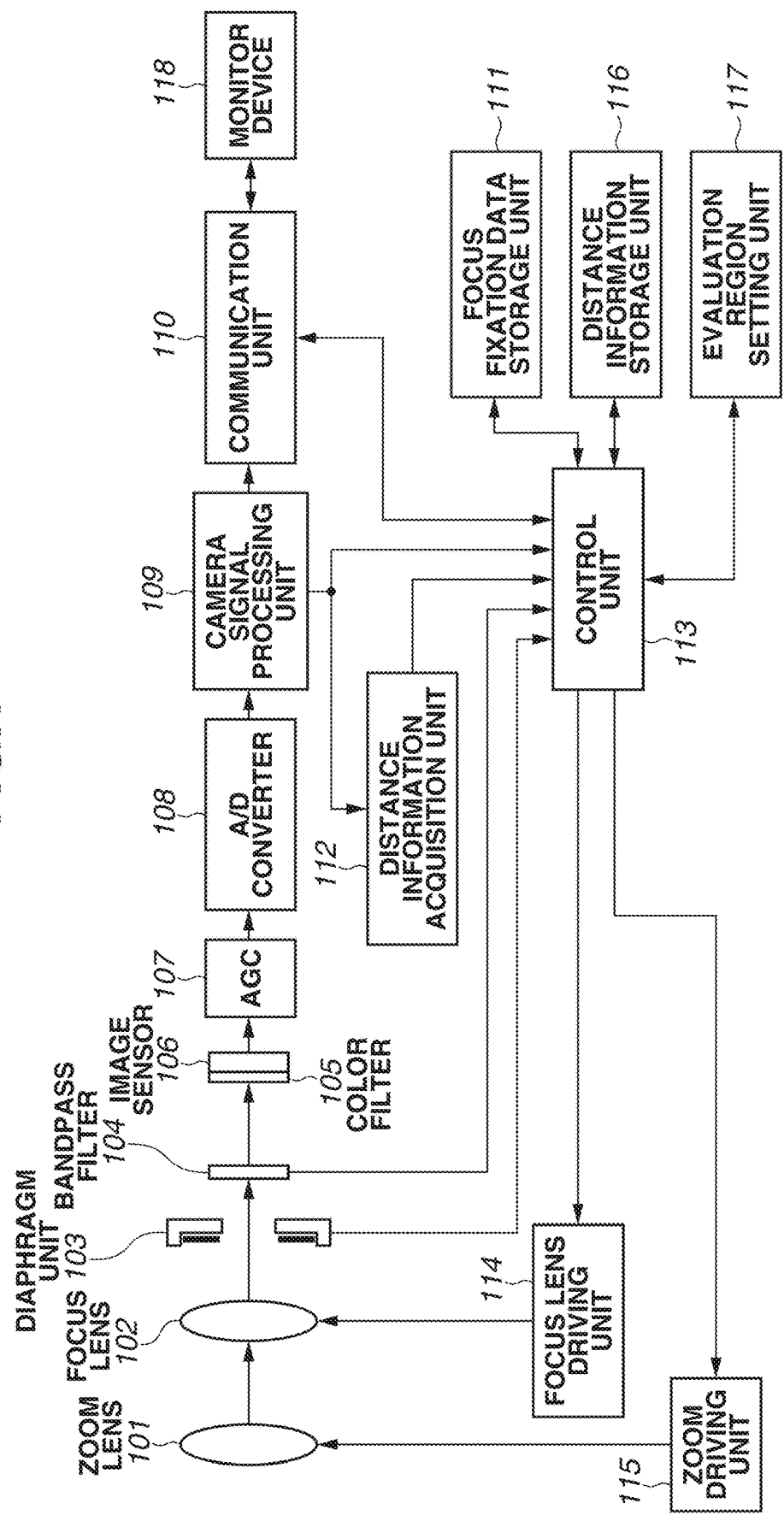
FIG. 1 is a block diagram illustrating an example of the configuration of an imaging apparatus according to a first exemplary embodiment.

A first exemplary embodiment of the disclosure will be described. FIG. 1 is a block diagram illustrating an example of the configuration of an imaging apparatus according to the first exemplary embodiment. An imaging optical system of the imaging apparatus according to the present exemplary embodiment includes a zoom lens 101 to change a focal length by travelling in the optical axis direction, a focus lens 102 to adjust a focal point by moving in the optical axis direction, and a diaphragm unit 103 to adjust a quantity of light. Light passing through the imaging optical system forms a subject image as an optical image on an image sensor 106 through a bandpass filter 104 and a color filter 105. The bandpass filter 104 can be moved forward and backward along the optical path of the imaging optical system.

The subject image formed on the image sensor 106 is photoelectrically converted by the image sensor 106 into an analog electric signal (an imaging signal). The analog electric signal (the imaging signal) output from the image sensor 106 is subjected to a gain adjustment by an automatic gain control (AGC) 107 and is converted into a digital imaging signal by an analog-digital (A/D) converter 108. The digital imaging signal is then input to a camera signal processing unit 109. The camera signal processing unit 109 generates an image signal through performing various kinds of image processing on the digital imaging signal. This image signal is output to a monitor device 118 connected to the imaging apparatus through wired or wireless communication via a communication unit 110, and is also output to a control unit 113 in the imaging apparatus.

A focus fixation data storage unit 111 stores ON/OFF information on a focus position fixation mode, which is a mode of fixing a focus position at which the subject is in focus, and mode information indicating a mode selected in the focus position fixation mode. These pieces of mode information are written into the focus fixation data storage unit 111 via the control unit 113 and the communication unit 110 in communication with the monitor device 118 operated by a user (a surveillant). OFF mode information is automatically changed to ON mode information that indicates that the focus position fixation mode is set upon completion of manual focus (MF) processing or automatic focus (AF) processing triggered by an operation by the user.

Figure 2:
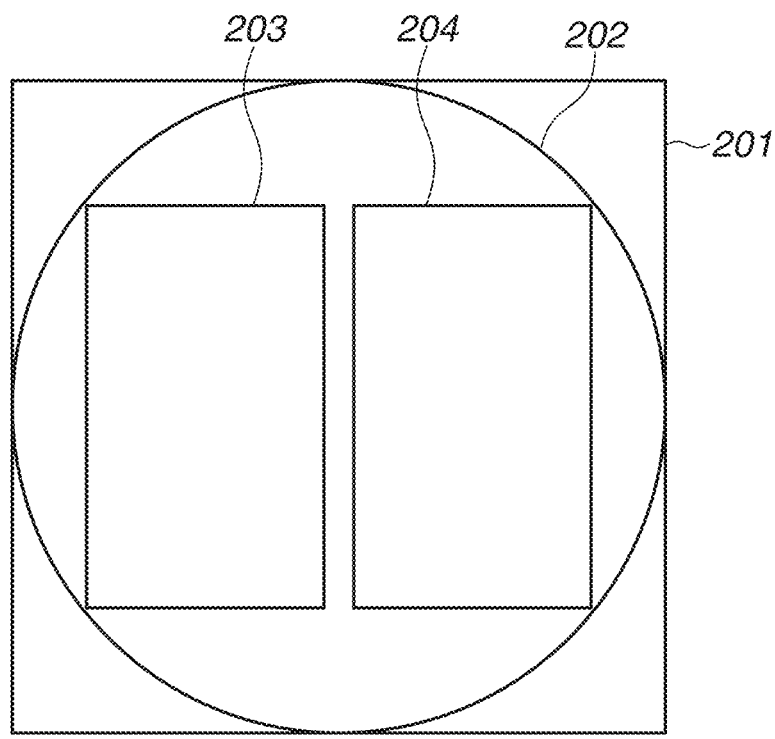
FIG. 2 is a diagram illustrating the configuration of an image sensor according to the first exemplary embodiment.

A distance information acquisition unit 112 acquires distance information on each region in an image set by an evaluation region setting unit 117, based on the image signal acquired by the camera signal processing unit 109. The distance information acquisition unit 112 is, for example, a phase difference sensor. Now, how to calculate the distance information will be described with reference to FIG. 2. FIG. 2 schematically illustrates a configuration of one pixel in the image sensor 106. As illustrated in FIG. 2, one pixel 201 includes a microlens 202. Further, the one pixel 201 includes a plurality of photodiodes (PDs) as a plurality of photoelectric conversion regions. FIG. 2 illustrates an example in which the one pixel 201 includes two PDs 203 and 204. One pixel includes at least two PDs, and the number of PDs is not limited.

Figure 3:
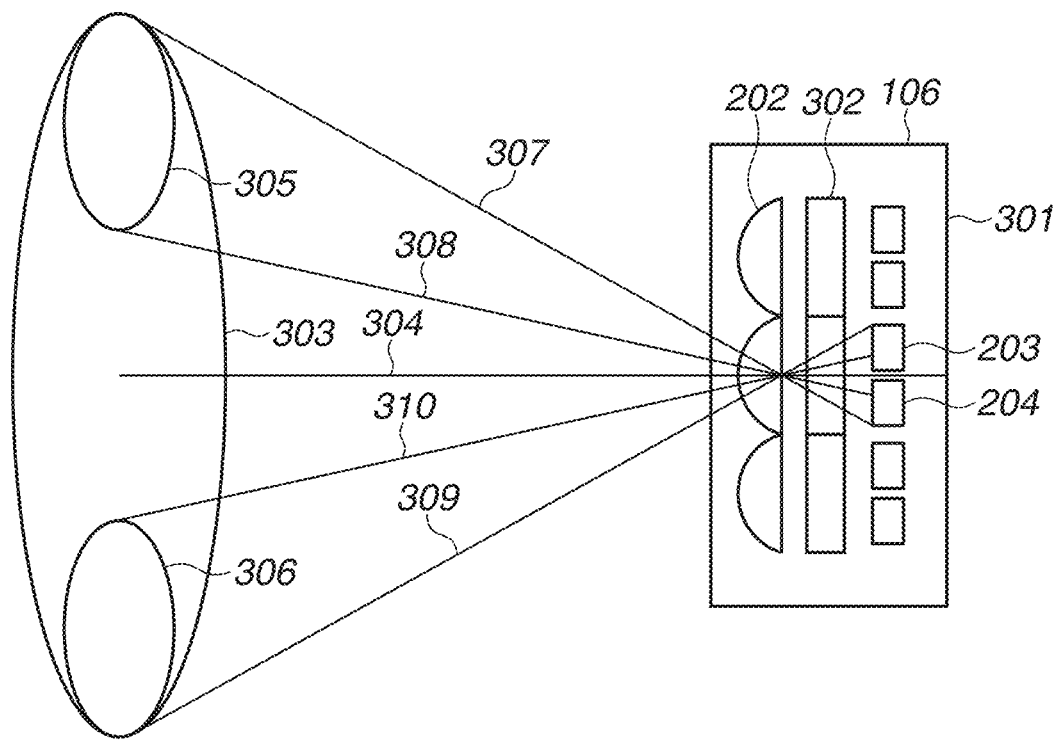
FIG. 3 is a diagram illustrating the configuration of the image sensor according to the first exemplary embodiment.

FIG. 3 conceptually illustrates how a luminous flux emitted from an exit pupil 303 of the focus lens 102 is incident on the image sensor 106. FIG. 3 illustrates a cross section 301 of a pixel array, the microlens 202 of FIG. 2, a color filter 302, and the PDs 203 and 204 of FIG. 2. In this example, the center of the luminous flux emitted from the exit pupil 303 of the focus lens 102 into the pixel 201 including the microlens 202 is taken as an optical axis 304. The light emitted from the exit pupil 303, about the optical axis 304, is incident on the image sensor 106. Regions 305 and 306 are partial regions of the exit pupil 303 of the focus lens 102. Rays 307 and 308 are outermost rays of the light passing through one partial region 305, and rays 309 and 310 are outermost rays of the light passing through the other partial region 306.

As understood from FIG. 3, the luminous flux emitted from the exit pupil 303 is divided at the optical axis 304 into an upper part and a lower part. The upper luminous flux is incident on the PD 204, and the lower luminous flux is incident on the PD 203. In other words, the PDs 203 and 204 each receive the light of a different region of the exit pupil 303 of the focus lens 102 from each other. Then, assuming that an A image is formed from a signal received by the PD 203 and a B image is formed from a signal received by the PD 204, a defocus amount can be calculated based on a parallax between the A image signal and the B image signal as a pair, and the distance information can be acquired based on that result. An expanded or compressed lens barrel due to a cause such as a change in temperature results in a different parallax between the A image and the B image from that before the change, thereby yielding a change in distance information acquired.

The control unit 113 performs automatic focus (AF) control using a contrast evaluation value indicating a contrast state of the image signal that is calculated based on an image signal and the distance information acquired by the distance information acquisition unit 112. A focus lens driving unit 114 drives the focus lens 102 under control of the control unit 113. A zoom driving unit 115 drives the zoom lens 101 under control of the control unit 113. A distance information storage unit 116 acquires the distance information acquired by the distance information acquisition unit 112 via the control unit 113, and stores the distance information.

Figure 4:
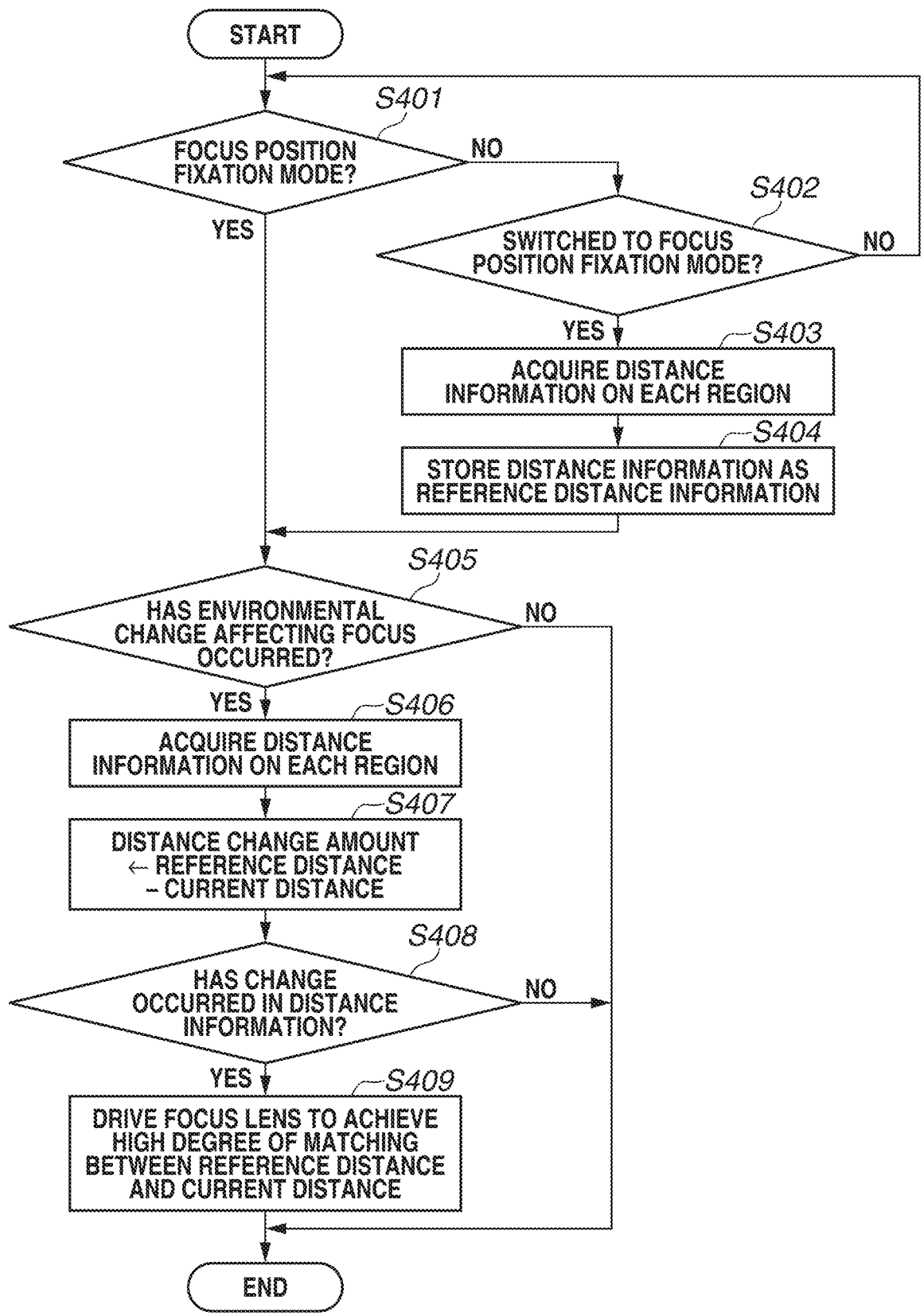
FIG. 4 is a flowchart illustrating an example of focus control processing according to the first exemplary embodiment.

Next, focus control processing (a focus control method) will be described that is performed by the control unit 113 according to the present exemplary embodiment. FIG. 4 is a flowchart illustrating an example of the focus control processing performed by the control unit 113 according to the present exemplary embodiment. The control unit 113, which is a computer, performs the focus control processing based on a focus control program as a computer program. In the present processing, the focus control program is called and executed every predetermined time.

In step S401, the control unit 113 determines whether the focus position fixation mode is set. If the control unit 113 determines that the focus position fixation mode is set (YES in step S401), the processing proceeds to step S405. On the other hand, if the control unit 113 determines that the focus position fixation mode is not set (NO in step S401), the processing proceeds to step S402, and returns to step S401 until the focus position fixation mode is set.

Figure 5:
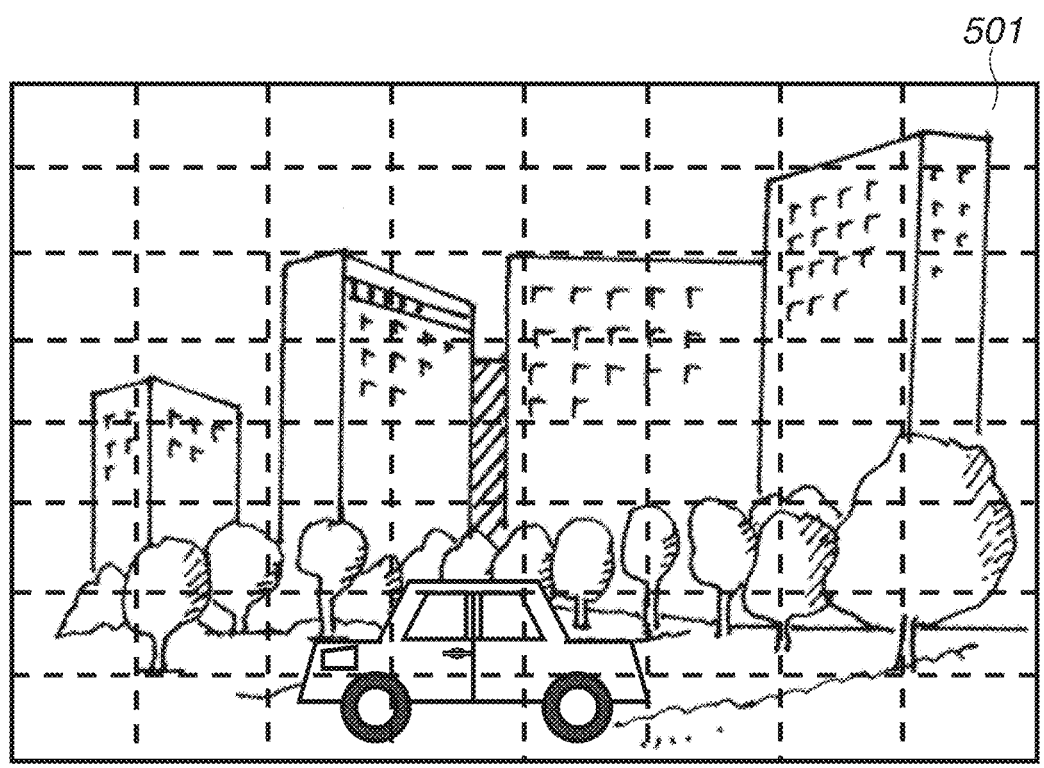
FIG. 5 is a diagram illustrating region segmentation according to the first exemplary embodiment.

In step S402, if an instruction is issued to set the focus position fixation mode (YES in step S402), the processing proceeds to step S403. In step S403, the control unit 113 acquires the distance information on each region in the image that is calculated by the distance information acquisition unit 112. A description of regions in the image follows with reference to FIG. 5. In FIG. 5, a region 501 surrounded by a broken line indicates one region of which the distance information is acquired. In the present exemplary embodiment, the control unit 113 acquires an average with respect to each of all the regions. Targeted regions are not necessarily all the regions, and may be only part of the regions. In step S404, the control unit 113 stores the distance information acquired in step S403 into the distance information storage unit 116 as reference distance information.

In step S405, the control unit 113 determines whether an environmental change affecting the focus has occurred. If the control unit 113 determines that an environmental change affecting the focus has occurred (YES in step S405), the processing proceeds to step S406. If the control unit 113 determines that no environmental change affecting the focus has occurred (NO in step S405), the processing is ended. Examples of environmental changes affecting focus include installation and/or removal of the bandpass filter 104, a change in temperature of the lens barrel, vibration, and a change in the light source.

In step S406, the control unit 113 acquires the distance information on each region in the image that is calculated by the distance information acquisition unit 112. In step S407, the control unit 113 determines a distance change amount by calculating, for each region, a difference between the reference distance information stored in step S404 and the distance information acquired in step S406.

Subsequently, in step S408, the control unit 113 determines whether a change has occurred in the distance information based on the distance change amount calculated in step S407. For example, the control unit 113 may make a determination based on whether the absolute value of the distance change amount is larger than zero or may determine that a change has occurred in the distance information with the distance change amount larger than or equal to a threshold value. The threshold value used here is a value determined by, for example, the degree of defocus with respect to the change amount of the distance information being measured in advance. If the control unit 113 determines that a change has occurred in the distance information (YES in step S408), the processing proceeds to step S409; otherwise (NO in step S408), the processing is ended.

In step S409, the control unit 113 causes the focus lens driving unit 114 to repeatedly drive the focus lens 102 to maximize the degree of matching between the current distance information and the reference distance information stored in step S404. For example, a mean error is used as the degree of matching between the current distance information and the reference distance information (in this case, the degree of matching increases as the mean error reduces). For example, a method similar to the known contrast AF can be adopted for driving the focus lens 102. After driving the focus lens 102, the control unit 113 stops the focus lens 102 at the position where the degree of matching between the current distance information and the reference distance information is maximized, and ends the processing.

According to the first exemplary embodiment, the focus position can be corrected so that the current distance information and the reference distance information substantially match each other based on the distance information acquired from the image, whereby defocus due to an environmental change in the imaging optical system can be corrected in a simple system.

Next, a second exemplary embodiment of the disclosure will be described. The above-described first exemplary embodiment has been described referring to the example in which the focus correction is carried out based on the degree of matching between the current distance information and the reference distance information. However, this configuration drives the focus lens 102 repeatedly until the focus lens 102 reaches a position at which a high degree of matching is achieved between the current distance information and the reference distance information, which may last longer until the correction operation ends, increasing operations for the readjustment of the focus position.

In the second exemplary embodiment, the focus lens 102 is driven by a focus correction amount that is calculated based on a difference between distance information at a start of the processing and reference distance information, thereby providing a quicker correction process. The configuration of the imaging apparatus according to the second exemplary embodiment is similar to the imaging apparatus according to the first exemplary embodiment, and therefore the description thereof will be omitted.

Figure 6:
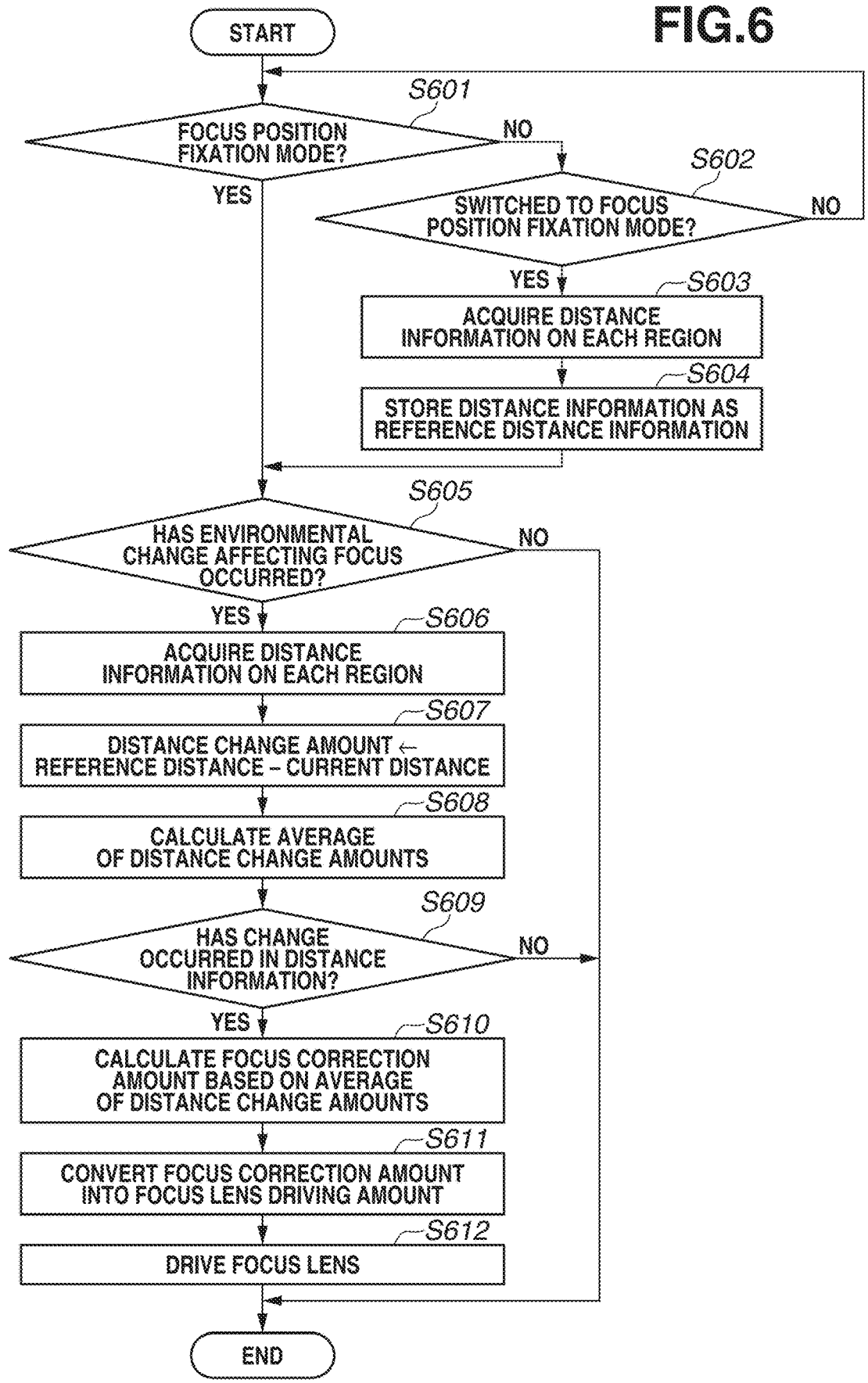
FIG. 6 is a flowchart illustrating an example of focus control processing according to a second exemplary embodiment.

FIG. 6 is a flowchart illustrating an example of focus control processing (a focus control method) performed by the control unit 113 according to the second exemplary embodiment. In steps S601 to S607, the control unit 113 performs processing similar to that in steps S401 to S407 according to the first exemplary embodiment illustrated in FIG. 4.

In step S608, the control unit 113 calculates the average of the distance change amounts of all the regions that have been calculated in step S607. In step S609, the control unit 113 determines whether a change has occurred in the distance information based on the average of the distance change amounts calculated in step S608. For example, the control unit 113 may make this determination based on whether the average of the distance change amounts is larger than zero or may determine that a change has occurred in the distance information if this average is larger than or equal to a given threshold value. The threshold value used here is a value determined by, for example, the extent of defocus being measured with respect to each change amount of the distance information in advance. If the control unit 113 determines that a change has occurred in the distance information (YES in step S609), the processing proceeds to step S610; otherwise (NO in step S609), the present processing is ended.

In step S610, the control unit 113 calculates a focus correction amount based on the average of the distance change amounts calculated in step S608. In the present exemplary embodiment, the control unit 113 calculates the focus correction amount following an expression, for example, the focus correction amount=$(-1) \times$the average of the distance change amounts (the average of the defocus amounts).

Next, in step S611, the control unit 113 converts the focus correction amount calculated in step S610 into a focus lens driving amount. Subsequently, in step S612, the control unit 113 causes the focus lens driving unit 114 to drive the focus lens 102 by the focus driving amount. Then, the present processing is ended.

Next, a third exemplary embodiment of the disclosure will be described. The above-described first exemplary embodiment has been described using the example in which the focus correction is carried out based on the change amounts of the pieces of distance information on all the regions. The first exemplary embodiment provides an effective correction through simple processing. However, a change such as a movement of the subject that has occurred in the focus position fixation mode affects the distance information on the regions in which the subject has moved. This may effect an error in the correction.

If defocus occurs due to an external factor such as a change in temperature or light source, or vibration with no change in the subject, the distance information is likely to be changed in a direction in all the regions. In view of the above, in the third exemplary embodiment, the changed direction in the distance information in each region is extracted and then a defocus direction due to an external factor is estimated by majority rule. Then, the above error is reduced by correction processing with only the distance information on each region of which the distance information has changed in the estimated direction. The configuration of the imaging apparatus according to the third exemplary embodiment is similar to that of the imaging apparatus according to the first exemplary embodiment, and therefore the description thereof will be omitted.

Figure 7:
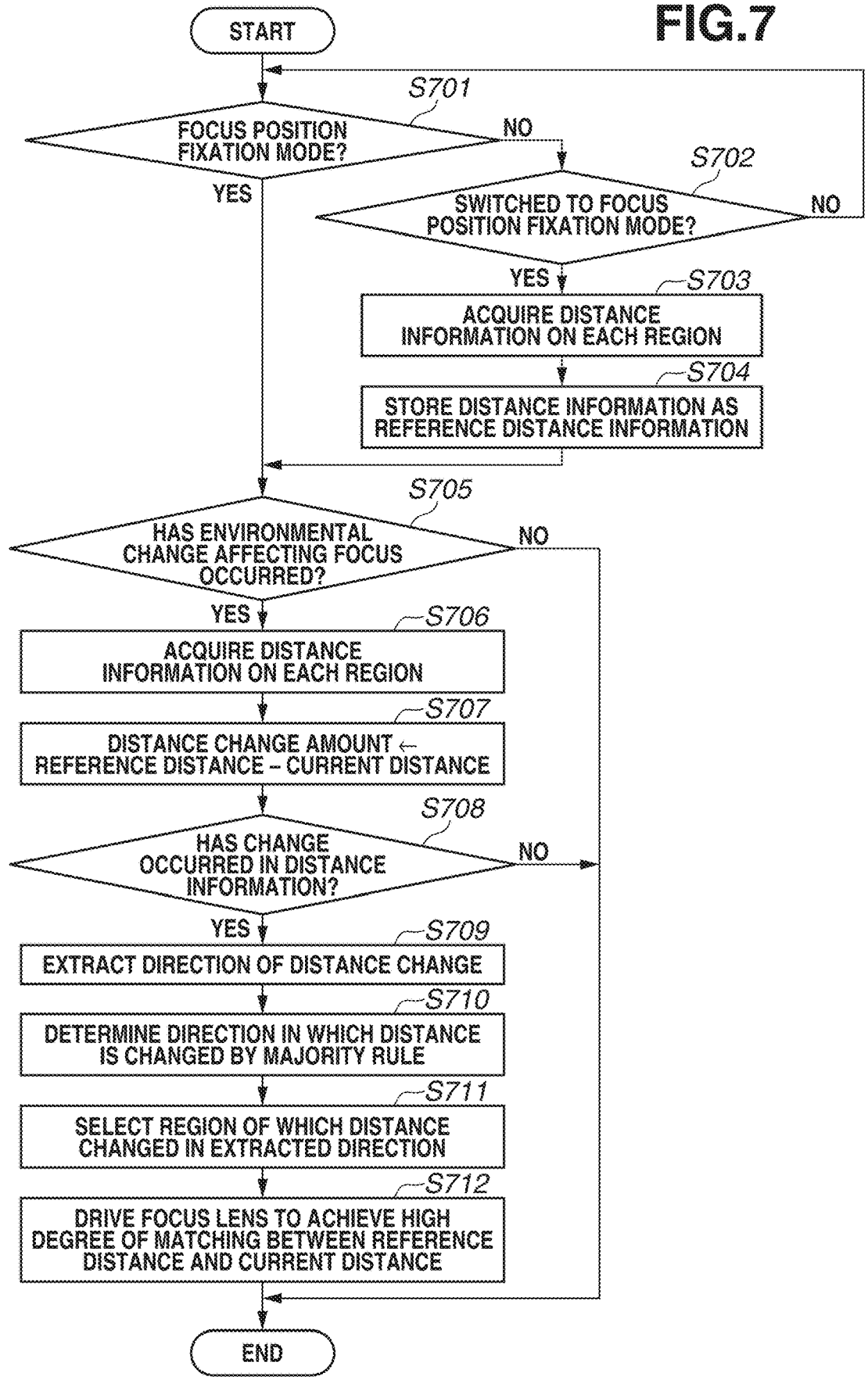
FIG. 7 is a flowchart illustrating an example of focus control processing according to a third exemplary embodiment.

FIG. 7 is a flowchart illustrating an example of focus control processing (a focus control method) performed by the control unit 113 according to the third exemplary embodiment. In steps S701 to S708, the control unit 113 performs processing similar to that in steps S401 to S408 according to the first exemplary embodiment illustrated in FIG. 4.

In step S709, the control unit 113 extracts the direction of the distance change in each region based on the distance change amount calculated in step S707. The extracted direction of the distance change is determined to be any of three patterns "distancing", "approaching", and "unchanged". A region in which the calculated distance change amount in step S707 has a negative sign is extracted as "distancing". A region in which the calculated distance change amount has a positive sign is extracted as "approaching". A region with zero calculated as the distance change amount is extracted as "unchanged". In step S710, the control unit 113 determines a direction of the distance change by majority rule. The control unit 113 extracts the most common direction of the directions of the distance changes extracted in step S709.

Next, in step S711, the control unit 113 selects the regions of which the distance information has changed in the extracted direction in step S710. Subsequently, in step S712, the control unit 113 drives the focus lens 102 for the regions selected in step S711 in a similar manner to that in step S409 in FIG. 4 according to the first exemplary embodiment. Then, the processing is ended.

In the third exemplary embodiment, the first driving of the focus lens 102 in step S712 may be in the direction of the distance change extracted in step S710. This reduces the time for the correction operation. Further, in the present exemplary embodiment, the control unit 113 drives the focus lens 102 repeatedly to maximize the degree of matching between the reference distance information and the current distance information. Alternatively, the focus lens 102 may be driven at a correction amount calculated based on the average of the distance change amounts, similarly to the second exemplary embodiment.

Next, a fourth exemplary embodiment of the disclosure will be described. The above-described first exemplary embodiment has been described using the example in which the focus correction is carried out based on the change amounts of the pieces of distance information on all the regions. According to the first exemplary embodiment, a change such as a movement of the subject in the focus position fixation mode affects the distance information on the regions in which the subject has moved. This may effect an error in the correction. In the fourth exemplary embodiment, the error is reduced by correction processing with only the distance information on each region of the fixed subject through an extraction of a fixed subject from the image.

Figure 8:
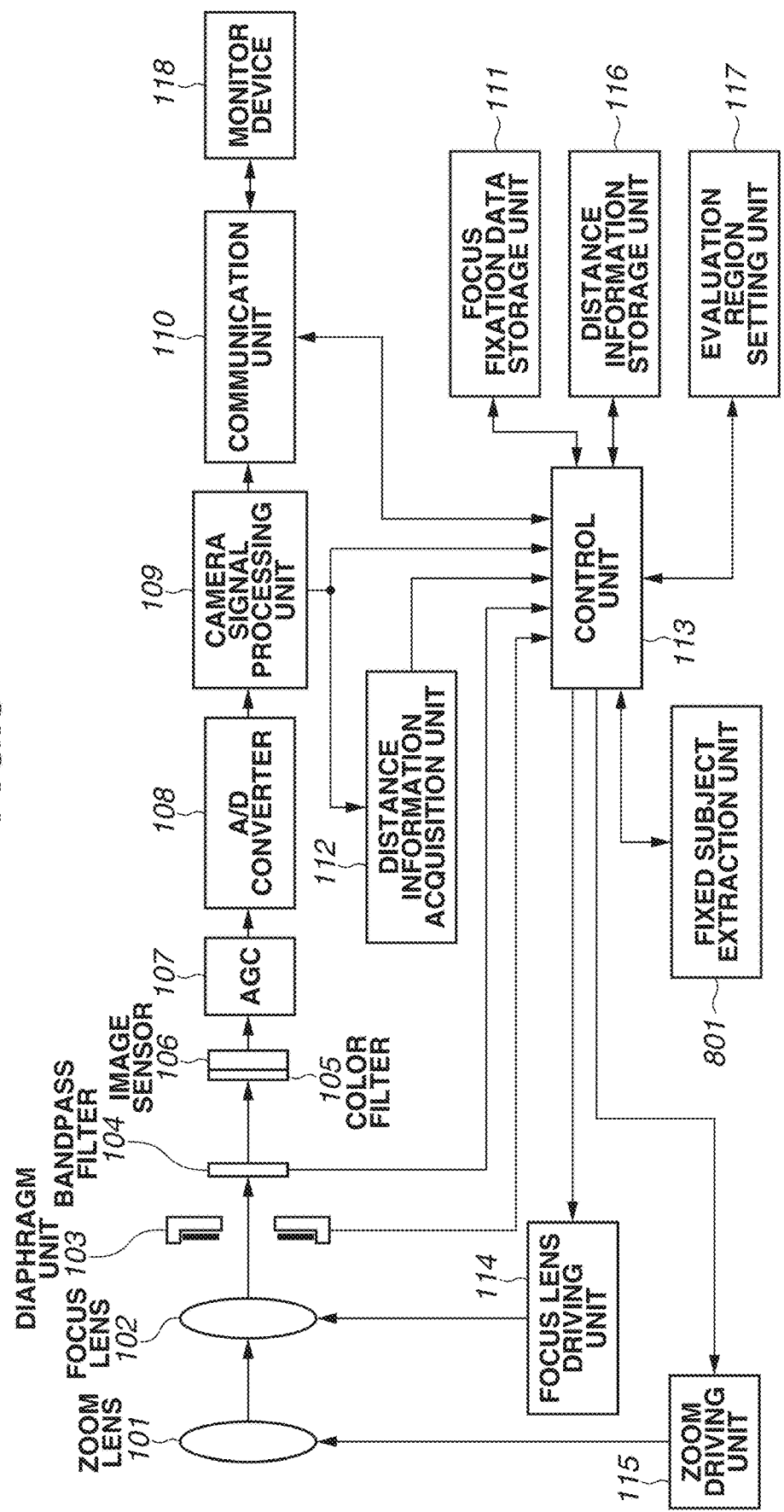
FIG. 8 is a block diagram illustrating an example of the configuration of an imaging apparatus according to a fourth exemplary embodiment.

FIG. 8 is a block diagram illustrating an example of the configuration of the imaging apparatus according to the fourth exemplary embodiment. In FIG. 8, the components having functions identical to those of the components in FIG. 1 are indicated by the same reference numerals, and the same descriptions will be omitted. A fixed subject extraction unit 801 receives the image signal via the control unit 113 and extracts a fixed subject contained in the image. Fixed subjects are extracted by object detection on machine learning or a semantic segmentation technique. The control unit 113 is notified of the result of the extraction by the fixed subject extraction unit 801 in association with coordinate information, subject type, and reliability of the extraction.

Figure 9:
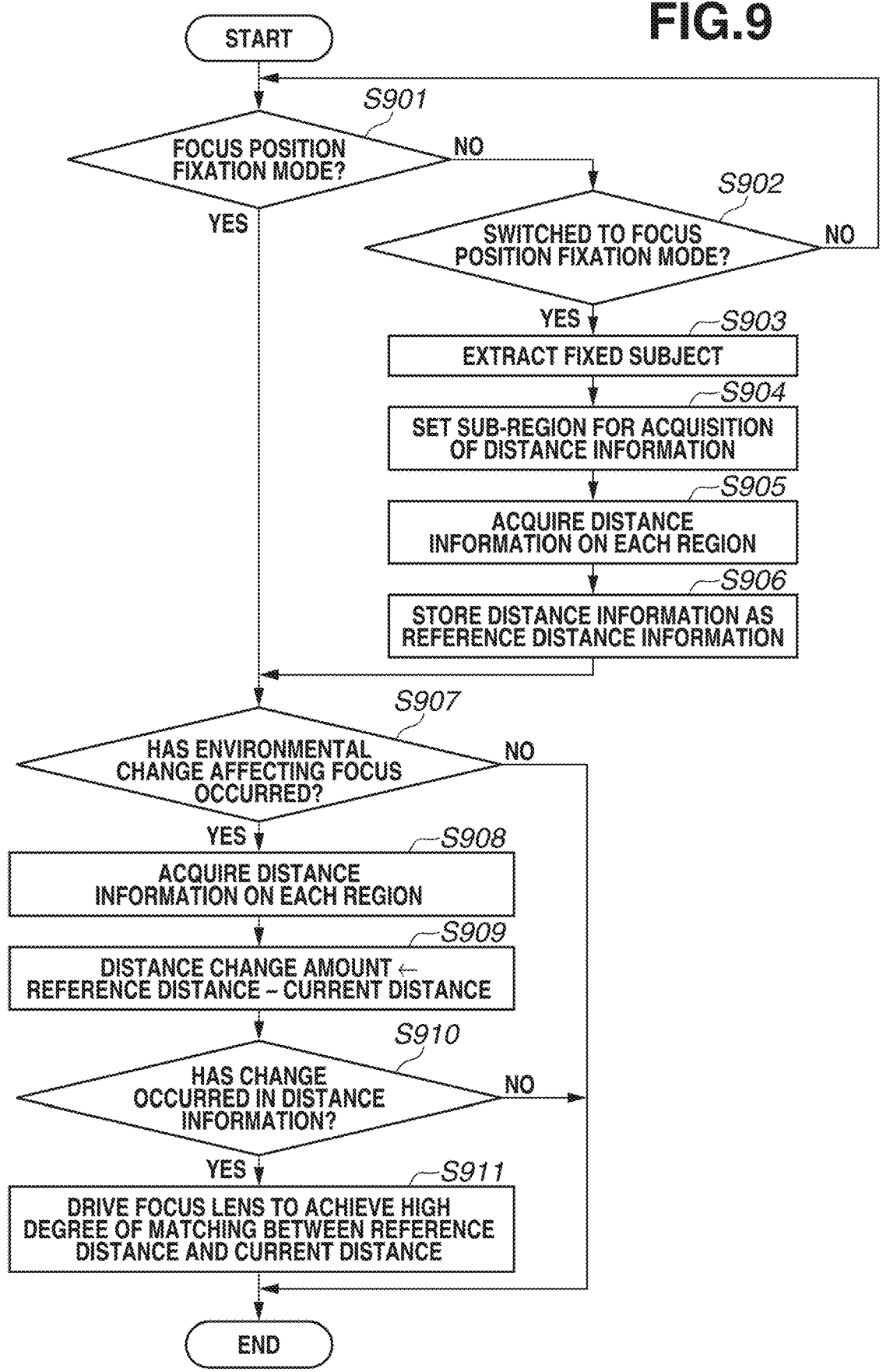
FIG. 9 is a flowchart illustrating an example of focus control processing according to the fourth exemplary embodiment.

Next, focus control processing (a focus control method) performed by the control unit 113 according to the present exemplary embodiment will be described. FIG. 9 is a flowchart illustrating an example of the focus control processing performed by the control unit 113 according to the fourth exemplary embodiment. In steps S901 and S902, the control unit 113 performs processing similar to that in steps S401 and S402 according to the first exemplary embodiment illustrated in FIG. 4.

Figure 10:
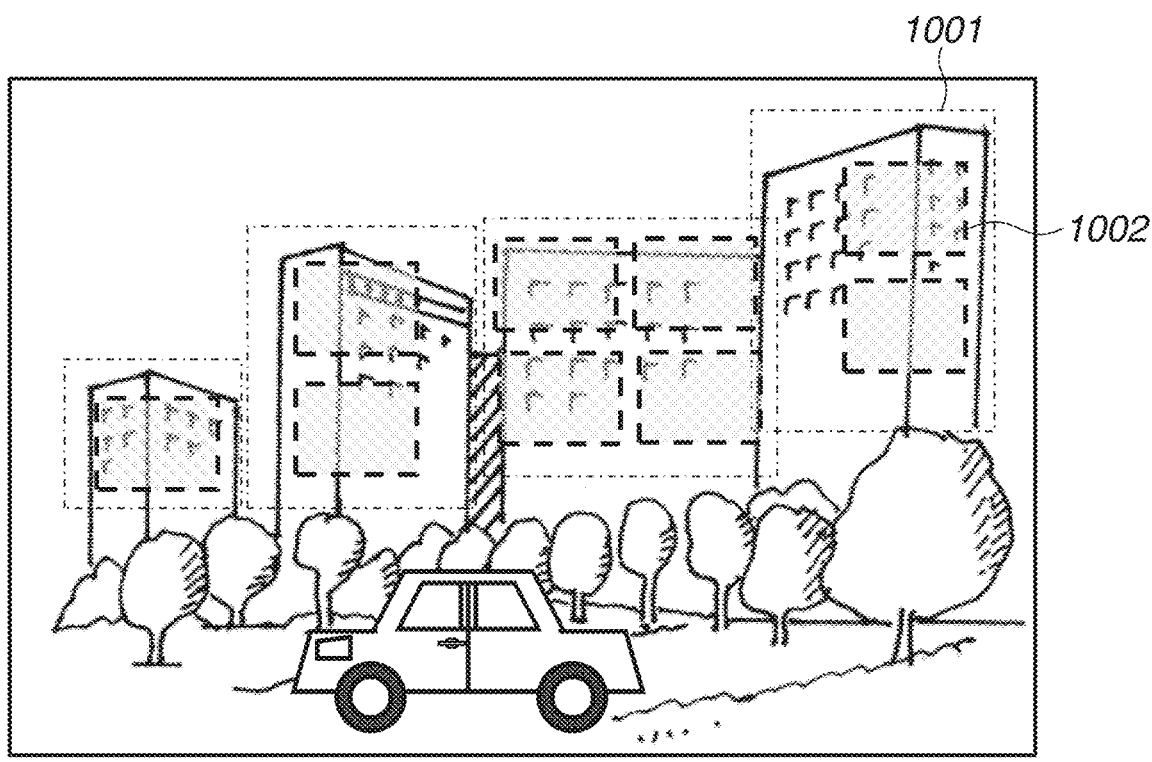
FIG. 10 is a diagram illustrating an example of region selection according to the fourth exemplary embodiment.

In step S903, the control unit 113 causes the fixed subject extraction unit 801 to extract a fixed subject in the image signal. Fixed subjects extracted in this step are immobile objects, such as buildings and steel towers. In step S904, the control unit 113 sets a sub-region contained in the region of each fixed subject extracted by the fixed subject extraction unit 801 in step S903 as a sub-region for acquiring the distance information. FIG. 10 illustrates an example of the sub-regions for acquiring the distance information set in step S904. FIG. 10 illustrates a fixed subject extraction region 1001, and the buildings are extracted as fixed subjects in the present example. FIG. 10 further illustrates each distance information acquisition sub-region 1002, which is set inside each fixed subject extraction region 1001.

In steps S905 to S911, the control unit 113 performs processing similar to that in steps S403 to S409 according to the first exemplary embodiment illustrated in FIG. 4. Then, a series of processing procedures is ended.

According to the fourth exemplary embodiment, distance information acquisition sub-regions are set in the regions corresponding to fixed subjects such as buildings or steel towers. This reduces the effect of a change in distance information by a subject's movement to accurately extract a change in distance information by varying focus, thereby reducing an error in a correction amount.

Each sub-region contained only in the region of a fixed subject is set as a distance information acquisition sub-region in step S904, but how to extract distance information on the region of a fixed subject is not limited thereto. For example, each region may be weighted in calculation of the degree of matching in step S911, with a sub-region in the region of a fixed subject weighted higher. This allows correction even with no fixed subject extracted. Further, weighting may be performed based on the value of reliability of an extraction of each fixed subject acquired simultaneously in step S903. This allows the distance information on a fixed subject extracted with higher accuracy to be used in priority correction processing, increasing correction accuracy. Additionally, in the present exemplary embodiment, the focus lens 102 is repeatedly driven to maximize the degree of matching between the reference distance information and the current distance information. Alternatively, the focus lens 102 may be driven at a correction amount calculated based on the average of the distance change amounts, similarly to the second exemplary embodiment.

Next, a fifth exemplary embodiment of the disclosure will be described. In the fifth exemplary embodiment, from among calculated correlations between varying temperatures and distances in individual regions, correction processing uses the distance information on only a region with a high correlation, reducing the occurrence of an error in a correction amount.

Figure 11:
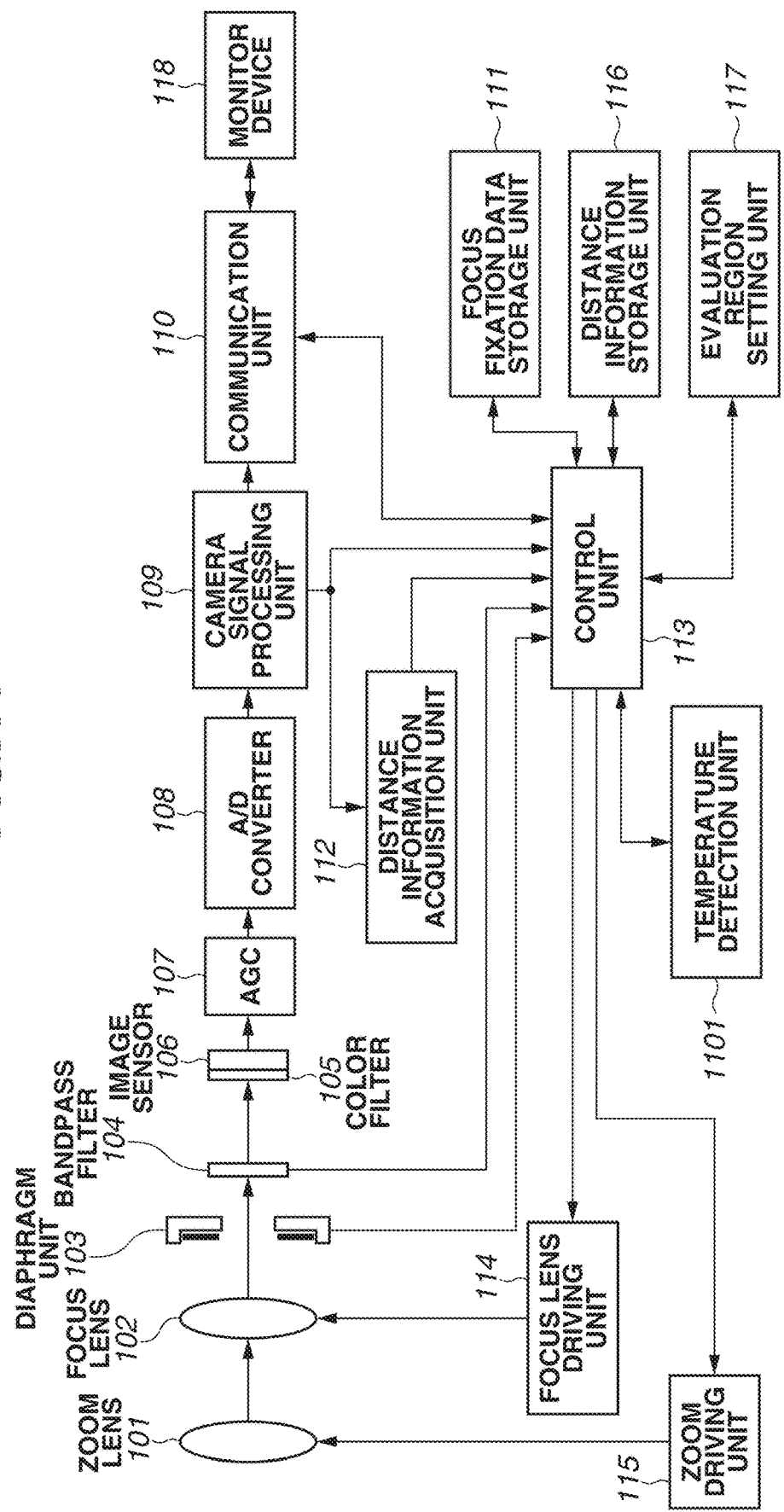
FIG. 11 is a block diagram illustrating an example of the configuration of an imaging apparatus according to a fifth exemplary embodiment.

FIG. 11 is a block diagram illustrating an example of the configuration of the imaging apparatus according to the fifth exemplary embodiment. In FIG. 11, the components having functions identical to those of the components illustrated in FIG. 1 are indicated by the same reference numerals, and the same descriptions will be omitted. A temperature detection unit 1101 detects the temperature of the lens barrel (the imaging optical system) of the imaging apparatus. A temperature sensor such as a thermistor is used as the temperature detection unit 1101. The control unit 113 acquires temperature information via the temperature detection unit 1101 every predetermined time to monitor variation in the temperature.

Figure 12:
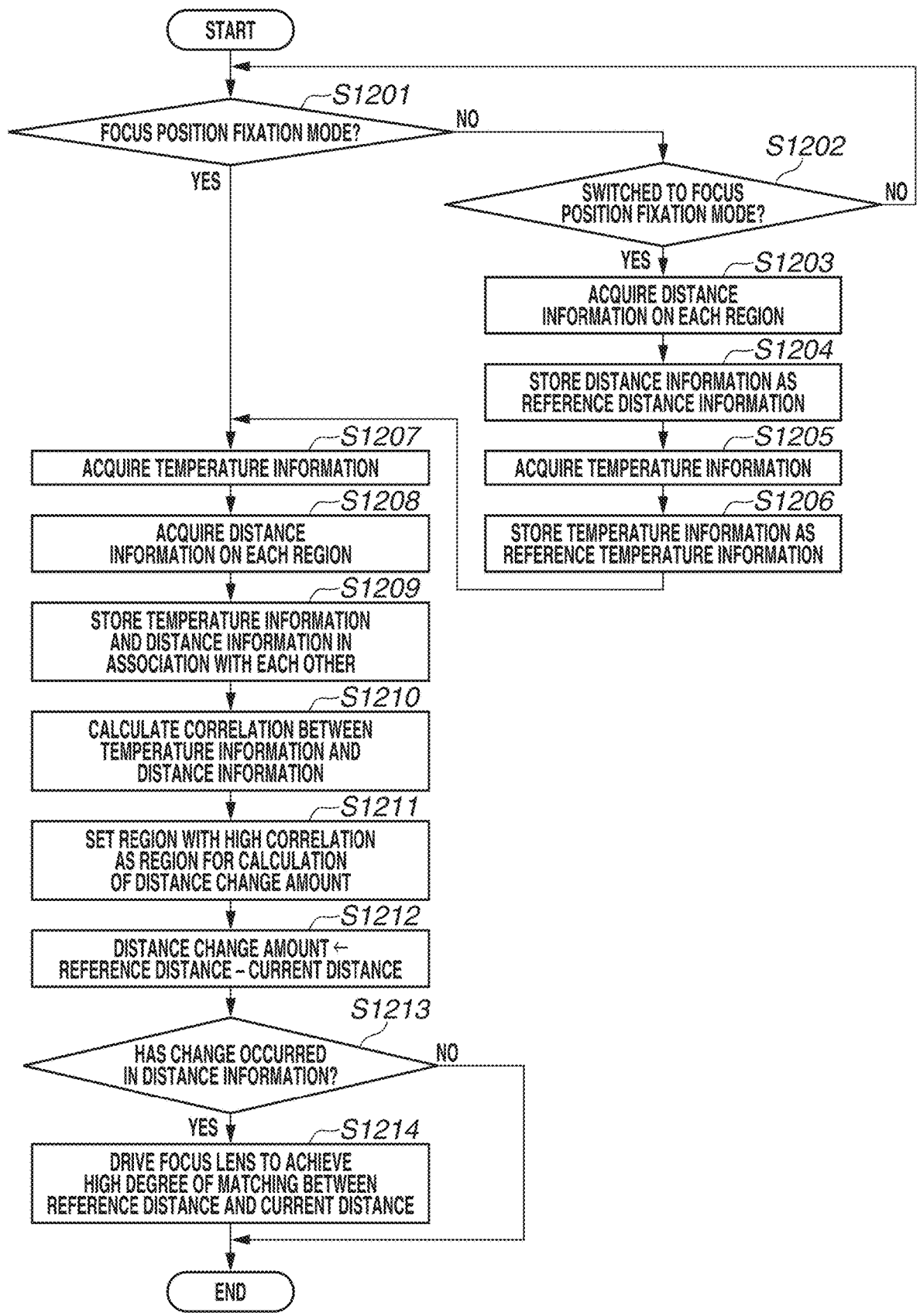
FIG. 12 is a flowchart illustrating an example of focus control processing according to the fifth exemplary embodiment.

FIG. 12 is a flowchart illustrating an example of focus control processing (a focus control method) performed by the control unit 113 according to the fifth exemplary embodiment. In steps S1201 to S1203, the control unit 113 performs processing similar to that in steps S401 to S403 according to the first exemplary embodiment illustrated in FIG. 4.

In step S1204, the control unit 113 stores the distance information acquired in step S1203 into the distance information storage unit 116 as the reference distance information, when the previous distance information that has been stored in the processing is deleted. In step S1205, the control unit 113 acquires temperature information via the temperature detection unit 1101. In step S1206, the control unit 113 stores the temperature information acquired in step S1205 as reference temperature information, when the previous temperature information that has been stored in the processing is deleted.

In step S1207, the control unit 113 acquires temperature information via the temperature detection unit 1101. In step S1208, the control unit 113 acquires the distance information on each region in the image in a similar manner to that in step S406 according to the first exemplary embodiment illustrated in FIG. 4. In step S1209, the control unit 113 associates the temperature information acquired in step S1207 with the distance information on each region acquired in step S1208 and then stores them.

In step S1210, the control unit 113 calculates a correlation coefficient between the temperature information and the distance information stored in step S1209, using the reference distance information stored in step S1204 and the reference temperature information stored in step S1206. Denoting the correlation coefficient by r, r can be found using the following equation (1).

$$r = \text{a covariance between temperatures and distances}/(\text{a standard deviation of temperatures} \times \text{standard deviation of distances}) \quad \text{Equation (1)}$$

The correlation coefficient r has a value in the range of (−1) to 1. A negative value indicates a negative correlation, and a positive value indicates a positive correlation. A higher absolute value indicates a higher correlation.

FIGS. 13A to 13C illustrate examples indicating relationships between temperatures and distances in different regions A, B, and C, respectively. FIG. 13D illustrates examples of the respective specific numerical values. In FIG. 13D, the shaded portions indicate the reference distance information and the reference temperature information. When the correlation coefficients are calculated using the equation (1), 0.99, 0.97, and −0.36 are found, respectively.

In step S1211, the control unit 113 sets a region with a higher absolute correlation coefficient calculated in step S1210 (over a threshold value) as a region for the calculation of the distance change amount. The threshold value is set at a high value for accuracy-oriented correction, or is adjusted to a low value when disturbance such as noise is allowed. In the present exemplary embodiment, the threshold value is set at 0.5 as an example. In the examples illustrated in FIGS. 13A to 13D, the regions A and B are set as the regions for the calculation of the distance change amount.

In step S1212, the control unit 113 calculates the distance change amounts of the regions set in step S1211. If no region is set in step S1211, the control unit 113 determines that the distance change amount is zero.

In step S1213, the control unit 113 determines whether a change has occurred in the distance information in a similar manner to that in step S408 according to the first exemplary embodiment illustrated in FIG. 4. Lastly, in step S1214, the control unit 113 performs processing on the region set in step S1211, similarly to that in step S409 according to the first exemplary embodiment illustrated in FIG. 4. Then a series of processing procedures is ended.

In the present exemplary embodiment, the control unit 113 drives the focus lens 102 repeatedly to maximize the degree of matching between the reference distance information and the current distance information. Alternatively, the focus lens 102 may be driven at a correction amount calculated based on the average of the distance change amounts similarly to the second exemplary embodiment.

Figure 14:
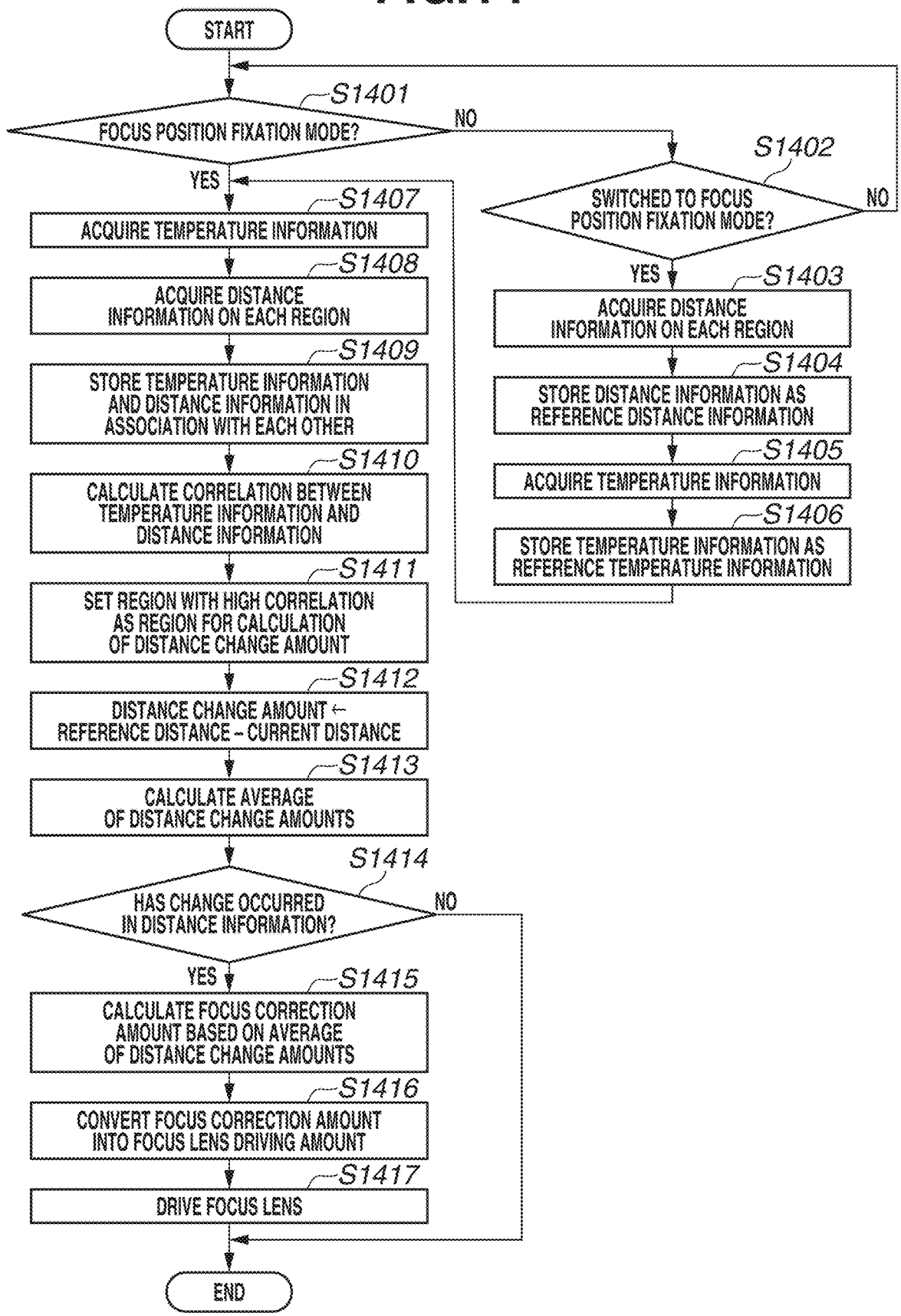
FIG. 14 is a flowchart illustrating another example of the focus control processing according to the fifth exemplary embodiment.

FIG. 14 is a flowchart illustrating an example of the focus control processing performed by the control unit 113 according to the fifth exemplary embodiment, and illustrates an example in which the control unit 113 drives the focus lens 102 at a correction amount calculated based on the average of the distance change amounts. In steps S1401 to S1412, the control unit 113 performs processing similar to that in steps S1201 to S1212 illustrated in FIG. 12.

In step S1413, the control unit 113 calculates the average of the distance change amounts calculated in step S1412 in the regions set in step S1411 in a similar manner to that in step S608 according to the second exemplary embodiment illustrated in FIG. 6. In step S1414, the control unit 113 determines whether a change has occurred in the distance information based on the average of the distance change amounts calculated in step S1413 in a similar manner to that in step S609 according to the second exemplary embodiment illustrated in FIG. 6.

In step S1415, the control unit 113 calculates a focus correction amount based on the average of the distance change amounts calculated in step S1413 in a similar manner to that in step S610 according to the second exemplary embodiment illustrated in FIG. 6. In step S1416, the control unit 113 converts the focus correction amount calculated in step S1415 into a focus lens driving amount in a similar manner to that in step S611 according to the second exemplary embodiment illustrated in FIG. 6. Subsequently, in step S1417, the control unit 113 drives the focus lens 102 by the focus lens driving amount in a similar manner to that in step S612 according to the second exemplary embodiment illustrated in FIG. 6. Then, the present processing is ended.

In each of the exemplary embodiments, if distance information cannot be acquired due to some cause such as a low illuminance, correction processing may be executed at a correction amount or a driving amount saved in advance per factor that changes a focus position.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-213416, filed Nov. 26, 2019, which is hereby incorporated by reference herein in its entirety.

What is claimed is:

1. An apparatus comprising:
    at least one processor; and
    a memory coupled to the at least one processor, the memory having instructions that, when executed by the processor, perform operations as:
    a control unit configured to adjust a focus position;
    an acquisition unit configured to acquire first distance information that indicates a distance to a subject on each of a plurality of regions within a predetermined region in a captured image, in a state where the focus positon is adjusted by the control unit; and
    a storage unit configured to store the first distance information acquired by the acquisition unit,
    wherein the acquisition unit is configured to acquire second distance information that indicates a distance to a subject on each of the plurality of regions within the predetermined region in a captured image, after the first distance information is stored,
    wherein the control unit adjusts the focus position so that a degree of matching between the first distance information and second distance information becomes higher, and
    wherein the control unit adjusts the focus position to maximize the degree of matching.

2. The apparatus according to claim 1, wherein the control unit adjusts the focus position based on the first distance information on a region selected in the captured image and the second distance information on the region.

3. The apparatus according to claim 1, wherein the control unit adjusts the focus position so that the first distance information and the second distance information substantially match each other.

4. The apparatus according to claim 1, wherein the control unit adjusts the focus position repeatedly to maximize the degree of matching.

5. The apparatus according to claim 1,
    wherein the control unit detects in each region a direction in which the second distance information is changed from the first distance information, and
    wherein the control unit adjusts the focus position based on the first distance information and the second distance information, the first distance information and the second distance information being on each region of which the second distance information is changed in a most common direction of the directions.

6. The apparatus according to claim 1, wherein the control unit detects in each region a direction in which the second distance information is changed from the first distance information, wherein the control unit starts adjusting the focus position in a most common direction of the directions.

7. The apparatus according to claim 1, wherein the control unit adjusts the focus position based on a change amount between the first distance information and the second distance information.

8. The apparatus according to claim 1, further comprising a detection unit configured to detect a fixed subject in the image,
    wherein the control unit adjusts the focus position based on the first distance information and the second distance information, the first distance information and the second distance information being on a region corresponding to the detected fixed subject.

9. The apparatus according to claim 1, further comprising:
    a sensing unit configured to sense a temperature; and
    a calculation unit configured to calculate a correlation between a change amount of the sensed temperature and the acquired distance information,
    wherein the control unit adjusts the focus position based on the first distance information and the second distance information, the first distance information and the second distance information being on a region with a high correlation calculated by the calculation unit.

10. The apparatus according to claim 1,
    wherein the storage unit stores in advance a relationship between a correction amount for the focus position and a factor in a focus position change in response to the focus position being adjusted, and
    wherein the control unit adjusts the focus position based on the relationship with no acquired distance information.

11. The apparatus according to claim 1, wherein the control unit adjusts the focus position based on the first distance information and the second distance information for an environmental change affecting the focus position that has occurred.

12. The apparatus according to claim 1, wherein the acquisition unit is a phase difference sensor.

13. A method for controlling an apparatus comprising:
    adjusting a focus position;
    acquiring first distance information that indicates a distance to a subject on each of a plurality of regions within a predetermined region in a captured image, in a state where the focus positon is adjusted;
    storing the first distance information into a storage unit;
    acquiring second distance information that indicates a distance to a subject on each of a plurality of regions within the predetermined region in a captured image, after the first distance information is stored; and
    adjusting the focus position so that a degree of matching between the stored first distance information and second distance information,
    wherein the adjusting adjusts the focus position to maximize the degree of matching.

14. The method according to claim 13, wherein the adjusting includes adjusting the focus position based on the first distance information on a selected region in the captured image and the second distance information on the region.

15. The method according to claim 13, wherein the adjusting includes adjusting the focus position so that the first distance information and the second distance information substantially match each other.

16. The method according to claim 13, wherein the adjusting includes adjusting the focus position repeatedly to maximize the degree of matching.

17. A non-transitory computer-readable medium storing a program for causing a computer to execute a method for controlling an apparatus, the method comprising:
    adjusting a focus position;

acquiring first distance information that indicates a distance to a subject on each of a plurality of regions within a predetermined region in a captured image, in a state where the focus positon is adjusted;

storing the first distance information into a storage unit;

acquiring second distance information that indicates a distance to a subject on each of a plurality of regions within the predetermined region in a captured image, after the first distance information is stored; and adjusting the focus position so that a degree of matching between the stored first distance information and second distance information becomes higher, wherein the adjusting adjusts the focus position to maximize the degree of matching.

18. The non-transitory computer-readable medium according to claim 17, wherein the adjusting includes adjusting the focus position based on the first distance information on a selected in the captured image and the second distance information on the region.

19. The non-transitory computer-readable medium according to claim 17, wherein the adjusting includes adjusting the focus position so that the first distance information and the second distance information substantially match each other.

20. The non-transitory computer-readable medium according to claim 17, wherein the adjusting includes adjusting the focus position repeatedly to maximize the degree of matching.

\* \* \* \* \*